No. 675,542. Patented June 4. 1901.
F. R. COATES.
RAIL JOINT.
(Application filed July 28, 1900.)
(No Model.)
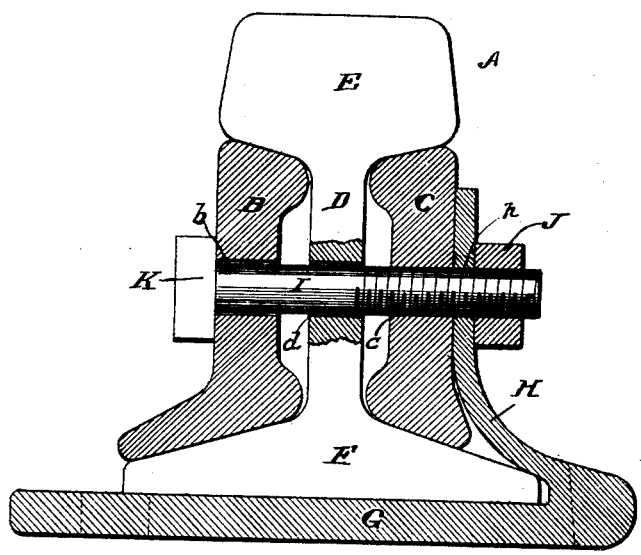

UNITED STATES PATENT OFFICE.

FRANK R. COATES, OF CHICAGO, ILLINOIS, ASSIGNOR TO THE WEBER RAILWAY JOINT MANUFACTURING COMPANY, OF SAME PLACE, NEW YORK, N. Y., BOSTON, MASSACHUSETTS, AND BALTIMORE, MARYLAND.

RAIL-JOINT.

SPECIFICATION forming part of Letters Patent No. 675,542, dated June 4, 1901.

Application filed July 28, 1900. Serial No. 25,077. (No model.)

*To all whom it may concern:*

Be it known that I, FRANK R. COATES, a citizen of the United States, residing at Chicago, in the county of Cook and State of Illinois, have invented certain new and useful Improvements in Rail-Joints, of which the following is a specification.

My invention relates to certain new and useful improvements in joints for railway-rails, and has particular reference to novel locking means for securing the parts together.

The object of my invention is to provide a simple and effective locking device for fastening together in a permanent manner the parts of a rail-joint embodying a base or shoe plate and which will not become loosened by the vibration and pounding to which the rails are subjected, but always remain in the locked position to which it has been adjusted.

With these and other ends in view I have illustrated my invention in the accompanying drawing, which shows a rail-joint comprising a rail A, the angle-plates B C, arranged on opposite sides of the web D of the rail and engaging with the head E and base F of the meeting ends of two rails, a base or shoe plate G, having an upright leg H, and a bolt I, passing through openings $b$ $c$ $d$ $h$ in the angle-plates, the web, and the upright leg, and fastening the parts together. This bolt is usually provided with a nut J, which frequently works loose, owing to the vibration of the rails and other causes, and permits the parts to separate in a manner which is liable to result in serious consequences.

It is my object to secure the bolt from working loose and provide a permanent lock for the parts; and this I accomplish in a very simple and inexpensive manner by providing a screw-threaded connection between the bolt, the leg, and one of the angle-plates, the nut J thereupon acting as a jam-nut and making a permanent lock.

The bolt is provided with a head K and is threaded, preferably, for about half of its length, so that the angle-plates can be drawn up tightly against the rail, and the nut J is then screwed on the end of the bolt against the upright leg. I may thread the bolt-openings $b$ $c$ of either of the angle-plates or thread alternate openings in both plates, so that of the four bolts usually employed two will be screwed into one angle-plate and two into the other.

It will be observed that my invention adds very little to the usual cost of manufacturing rail-joints, but at the same time it provides for securing and permanently locking the parts together.

I do not limit the application of my invention to the particular kind of rail-joint herein shown or to any special rail, angle-plates, or base-plates, as, so far as I am aware, it may be employed with any type of joint having angle or fish plates and a base or shoe plate of any kind. The thread is cut far enough up on the bolt to enable it to be tightened up whenever it may be necessary.

Having thus fully described my invention, what I claim, and desire to secure by Letters Patent, is—

In a rail-joint, the combination with a rail, of angle-plates on opposite sides of the rail, a base or shoe plate having an upright leg on one side thereof, a bolt passing through openings in the rail, the angle-plates and the upright leg and having a screw-threaded connection with the leg and its adjacent angle-plate, and a nut on the end of the bolt, substantially as described.

Signed at Chicago, Illinois, this 23d day of July, 1900.

FRANK R. COATES.

Witnesses:
WM. O. BELT,
S. D. THOMPSON.